United States Patent [19]

Hull

[11] Patent Number: 5,757,721
[45] Date of Patent: May 26, 1998

[54] INVERSE METHOD TO MEASURE THE BREATHING WAVE SPEED IN A LIQUID-FILLED CYLINDRICAL SHELL

[75] Inventor: Andrew J. Hull, Middletown, R.I.

[73] Assignee: The United States of America as represented by the Secretary of the Navy, Washington, D.C.

[21] Appl. No.: 821,552

[22] Filed: Mar. 21, 1997

[51] Int. Cl.⁶ .................................................. H04B 17/00
[52] U.S. Cl. ............................ 367/13; 367/901; 367/130
[58] Field of Search ............................. 367/13, 901, 130, 367/106, 154, 24, 21

[56] References Cited

U.S. PATENT DOCUMENTS

| | | | |
|---|---|---|---|
| 5,251,183 | 10/1993 | McConnell et al. | 367/21 |
| 5,532,979 | 7/1996 | Hansen et al. | 367/106 |

*Primary Examiner*—Daniel T. Pihulic
*Attorney, Agent, or Firm*—Michael J. McGowan; James M. Kasischke; Prithvi C. Lall

[57] ABSTRACT

Disclosed is an inverse method for measuring the breathing wave speed in a liquid-filled cylindrical shell. The model used with this method is based on an experimental configuration where a shell is attached to a mechanical shaker at the forward end, which initiates longitudinal wave propagation. The resulting spatial field in the shell consists of extensional and breathing waves. End-mounted accelerometers and force transducers are used to measure the extensional wave speed. Once this is accomplished, transfer functions between five equally spaced hydrophones that are in the fluid and a forward accelerometer are recorded. These data are then combined to yield a closed form value of the complex, frequency-dependent breathing wave speed. The experiment included to validate this method is extremely easy to implement and can be executed in a short period of time.

16 Claims, 2 Drawing Sheets

INVERSE METHOD TO MEASURE THE BREATHING WAVE SPEED IN A LIQUID-FILLED CYLINDRICAL SHELL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to methods of measuring and testing and more particularly to methods of measuring wave velocity in a fluid-filled shell 10.

(2) Brief Description of the Prior Art

The U.S. Navy utilizes towed arrays as receivers in its sonar systems to detect surface craft and submarines. These towed arrays consist of an elastomeric hose filled with oil or some other dielectric fluid. Disposed within the hose along its length are a plurality of hydrophones which can be piezoelectric, optical or electromagnetic vibration sensors. In operation, a vessel tows the array and receives acoustic signals from the sensors disposed therein. Noise in the array can be caused by extensional, transverse and breathing vibrations. In order to improve the operating characteristics of the array it is desirable to model and determine the characteristics of these vibration sources.

The breathing (or bulge) wave is a fluid-solid interaction wave that propagates in liquid-filled shells, and its wave speed is typically modeled as a complex, frequency-dependent quantity. This wave can be generated by applying axial excitation to one or both ends of the shell. Breathing and extensional wave motion is initiated at the location of this excitation, and both of these waves propagate longitudinally in the shell 10. Additionally, the shell ends reflect such wave motion, and the shell domain dissipates some of the energy, creating a spatial field composed of partially standing and partially propagating waves. This wave motion causes a change in the cross-sectional area of the shell, which creates a pressure differential in the fluid. The amplitude of the fluid pressure created by the breathing wave is much stronger at lower frequencies which is typically below 20 Hz for most liquid-filled shells. A previous technique to measure breathing wave speed resulted in a single frequency measurement that did not include the loss (imaginary) term of the wave. Additionally, this method required sensors near the end cap of the shell which is an area that is very susceptible to acoustic scattering.

SUMMARY OF THE INVENTION

A first object of this invention is to provide a method for measuring breathing speed in a liquid filled cylinder.

Another object of this invention is to provide such a method that includes the loss term of the breathing wave.

Yet another object of this invention is to apply such a method that does not require sensors near the ends of the liquid filled cylinder.

The present invention is a method of measuring breathing wave speed in a liquid-filled shell comprising the steps of defining a spatial pressure field and separating the spatial pressure field into an extensional wave component and a breathing wave component. The extensional wave speed is ascertained from sensor measurements, and the breathing wave speed is calculated based on measurements of pressure in the liquid-filled shell and the extensional wave speed. The extensional wave speed is determined from experimental measurements of force and acceleration at the ends of the liquid-filled shell. The force is measured by force transducers located at the ends of the liquid-filled shell. Acceleration is measured by accelerometers located at the ends of the shell. Pressure is measured by hydrophones contained in the shell, and preferably there are a plurality of hydrophones positioned at equally spaced intervals within the shell. The shell is preferably cylindrical.

BRIEF DESCRIPTION OF THE DRAWINGS

Other objects, features and advantages of the present invention will become apparent upon reference to the following description of the preferred embodiments and to the drawings, wherein.

DETAILED DESCRIPTION OF THE PREFERRED EMBODIMENT

Figure 1:
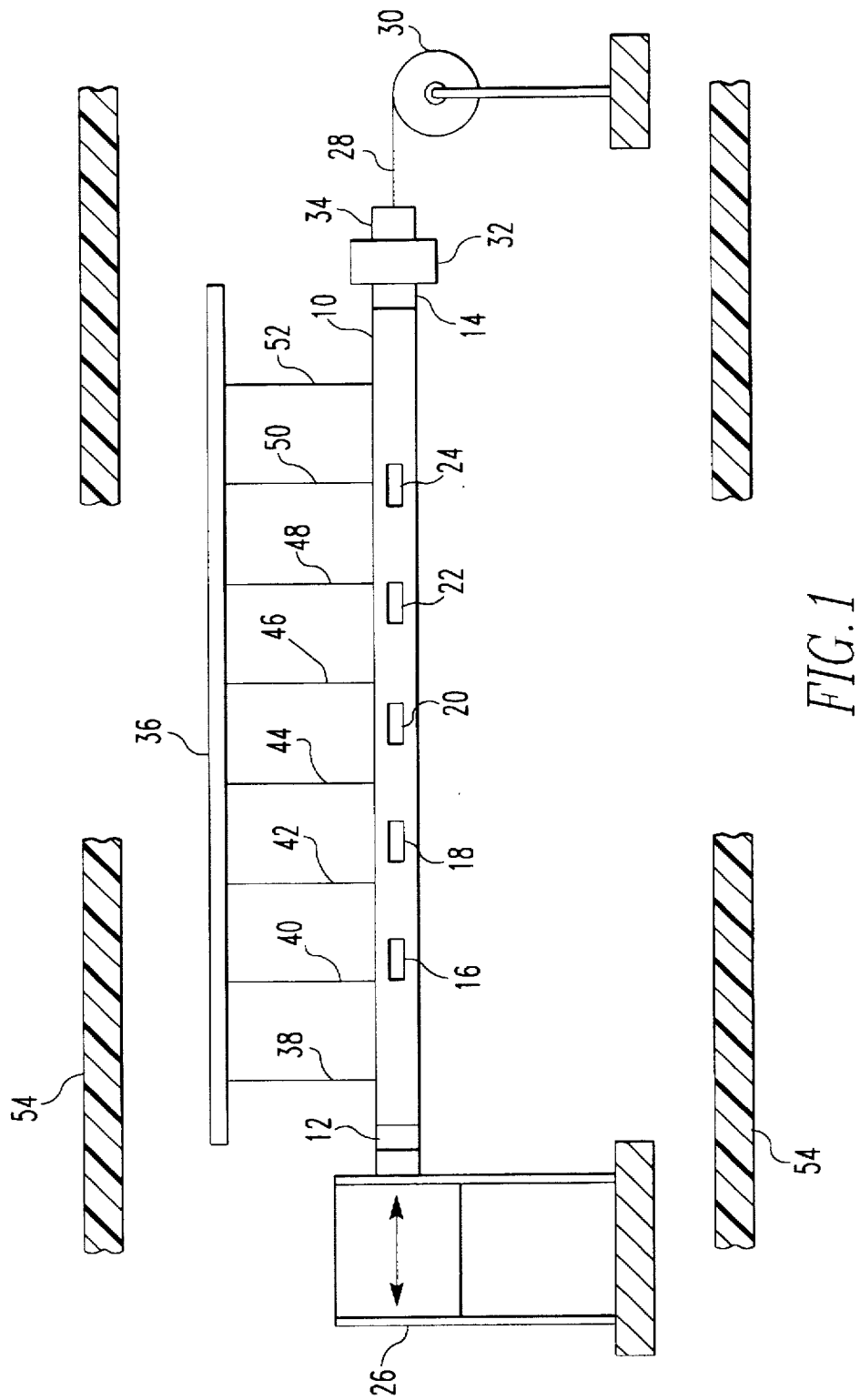
FIG. 1 is a schematic illustration of an apparatus for performing the method of determining the speed of breathing waves according to the method of the present invention.

Referring to FIG. 1, an apparatus for carrying out the method of the present invention shown in which there is a liquid-filled cylindrical shell 10. At the opposed ends of shell 10 there is an impedance head 12 and 14. At equally spaced intervals over the axial length of shell 10 there are hydrophones 16, 18, 20, 22 and 24. A longitudinal shaker 26 is joined to shell 10. Shaker 26 provides axial excitation to the shell 10. A line 28 is attached to the aft end of the shell 10 and a winch or tension drum 30 allows the tension of the line 28 to be adjusted. A point mass 32 is attached between shell 10 and line 28 to increase the force levels and decrease acceleration levels. Mass 32 also produces an impedance change at the end of the shell 10 that is sufficiently large to allow accurate modeling of the shell behavior by a spring and damper system rather than as continuous media system. A load cell 34 measures this tension on the shell 10 and is located between line 28 and mass 32. Shell 10 is suspended by support lines 38, 40, 42, 44, 46, 48, 50 and 52 joined to a rail 36. Support lines 38, 40, 42, 44, 46, 48, 50 and 52 should be made from a stretch resistant material such as KEVLAR™ or the like. The entire unit is surrounded by an air conditioned duct 54 to permit temperature dependent testing. The impedance heads 12 and 14 collect data during testing. Each impedance head 12, 14 consists of a single axial force transducer and an accelerometer.

In order to measure the breathing wave speed, it is necessary to know the extensional wave speed. This complex, frequency-dependent quantity is determined using the measurements from the forward and aft impedance heads 12 and 14 in the apparatus described above. Although these measurements contain a breathing wave contribution, the contribution typically occurs only at low frequencies and can be discerned from the extensional wave effects with this method. This behavior is discussed in the example below.

The governing differential equation of the extensional ware is expressed in the spatial domain as a single wave equation with particle displacement as the independent variable:

$$\frac{d^2U(x,\omega)}{dx^2} + k_e^2 U(x,\omega) = 0, \tag{1}$$

where $U(x,\omega)$ is the temporal Fourier transform of the axial displacement, x is the spatial location (m), $\omega$ is the frequency of excitation (rad/s), and $k_e$ is the complex extensional wavenumber of the shell (rad/m). It is implicit in equation (1) that the fluid-loading effects of the extensional wave speed are incorporated in the axial model of the shell with a homogeneous medium that supports longitudinal wave motion. Although this approximation is not sufficient to model the radial motion of the shell, it is an accurate model of axial motion and its corresponding extensional wave propagation. The extensional wavenumber is equal to $$k_e = \frac{\omega}{c_e}, \tag{2}$$

where $c_e$ is the complex extensional (longitudinal) wave speed of the shell (m/s). The energy attenuation in the shell is defined with a structural damping law, and therefore the wave speed is a complex quantity. The real part of the wave speed corresponds to energy transmission, and the imaginary part corresponds to energy attenuation.

The solution to equation (1) is $$U(x,\omega) = Ge^{ik_e x} + He^{-ik_e x}, \tag{3}$$

where G and H are coefficients determined by the boundary conditions at the ends of the shell and i is the square root of $-1$. It is not necessary to know these boundary conditions to determine the longitudinal wave speed of the shell. The temporal Fourier transform of the axial force in the shell is $$F(x,\omega) = A_s E_x \frac{dU(x,\omega)}{dx} = A_s E_x ik_e (Ge^{ik_e x} - He^{-ik_e x}), \tag{4}$$

where $A_s$ is the cross-sectional area of the shell (m$^2$) and $E_x$ is the effective longitudinal modulus of the shell (N/m$^2$). The known parameters in equations (3) and (4) are the location of the sensors (x) and the frequency of excitation ($\omega$). Although the effective longitudinal modulus ($E_x$) is unknown, equation (4) will be rewritten as a ratio of forces permitting the cancellation of this term and the cross-sectional area ($A_s$). The inversion of equations (3) and (4) at the sensor locations will allow for a measurement of the unknown extensional wave speed $c_e$. This technique is described next.

The extensional wave measurement part of the method has a forward and aft pair of sensors 12 and 14 to collect data that are in the form of transfer functions between each pair. The position of the forward pair 12 is defined as x=0 and of the aft pair 14 as x=L, where L is the length of the shell (m). The two transfer function measurements used are the forward displacement divided by the aft displacement and the forward force divided by the aft force. Their theoretical form can be rewritten using equations (3) and (4) as $$\frac{U(0,\omega)}{U(L,\omega)} = \frac{G+H}{Ge^{ik_e L} + He^{-ik_e L}} = R_1 \tag{5}$$

and $$\frac{F(0,\omega)}{F(L,\omega)} = \frac{G+H}{Ge^{ik_e L} - He^{-ik_e L}} = R_2, \tag{6}$$

where $R_1$ and $R_2$ are transfer function data from the experiment. Equations (5) and (6) are rewritten as functions of H/G and are set equal to each other, yielding $$\cos(k_e L) = \frac{R_2 R_1 + 1}{R_2 + R_1} = \phi, \tag{7}$$

where f is a complex quantity. Using an angle-sum relationship on the complex cosine term in equation (7) and separating the equation into real and imaginary parts results in $$\cosh[Im(k_e)L] = \frac{Re(\phi)}{\cos[Re(k_e)L]} \tag{8}$$

and $$\sinh[Im(k_e)L] = \frac{-Im(\phi)}{\sin[Re(k_e)L]}, \tag{9}$$

where Re denotes the real part and Im denotes the imaginary part of the corresponding complex quantity.

Equation (9) is now squared and subtracted from the square of equation (8), yielding $$\{\cosh[Im(k_e)L]\}^2 - \{\sinh[Im(k_e)L]\}^2 = \tag{10}$$

$$\frac{[Re(\phi)]^2}{\{\cos[Re(k_e)L]\}^2} - \frac{[Im(\phi)]^2}{\{\sin[Re(k_e)L]\}^2} = 1.$$

Equation (10) can be simplified using trigonometric power relationships to $$\cos[2Re(k_e)L] = [Re(\phi)]^2 + [Im(\phi)]^2 - \tag{11}$$

$$\sqrt{([Re(\phi)]^2 + [Im(\phi)]^2)^2 - (2[Re(\phi)]^2 + 2[Im(\phi)]^2 - 1)} = s.$$

Note that only a negative sign in front of the radical is used. The real part of $k_e$ in equation (11) is now solved for by $$Re(k_e) = \begin{cases} \frac{1}{2L} \text{Arccos}(s) + \frac{n\pi}{2L} & n \text{ even} \\ \frac{1}{2L} \text{Arccos}(-s) + \frac{n\pi}{2L} & n \text{ odd} \end{cases}, \tag{12}$$

where n is a nonnegative integer and the capital A denotes the principle value of the inverse cosine function. The value of n is determined from the function s, which is a cosine function with respect to frequency. At zero frequency, n is 0. Every time s cycles through $\pi$ radians, n is increased by 1. The imaginary part of $k_e$ is determined by adding equations (8) and (9) together, resulting in $$Im(k_e) = \frac{1}{L} \log_e \left\{ \frac{Re(\phi)}{\cos[Re(k_e)L]} - \frac{Im(\phi)}{\sin[Re(k_e)L]} \right\}. \tag{13}$$

Now that the real and imaginary parts of the wavenumber $k_e$ are known, the complex-valued extensional wave speed can be determined at each frequency with $$c_e = Re(c_e) + iIm(c_e) = \frac{\omega}{k_e}. \tag{14}$$

Note that the extensional wave speed has been measured without knowing the boundary conditions at x=0 and x=L.

The pressure field inside the fluid-filled shell is used to measure the breathing wave speed. The dynamic model of this field is derived from two wave equations in the spatial domain, both of which use pressure as the independent variable. The first equation models the extensional wave contribution and is written as $$\frac{d^2P_e(x,\omega)}{dx^2} + k_e^2 P_e(x,\omega) = 0, \quad (15)$$

where $P_e(x,\omega)$ is the temporal Fourier transform of the pressure that is generated by the extensional wave and $k_e$ is the extensional wavenumber that was determined using the method above. The second wave equation models the breathing wave contribution and is written as $$\frac{d^2P_b(x,\omega)}{dx^2} + k_b^2 P_b(x,\omega) = 0, \quad (16)$$

where $P_b(x,\omega)$ is the temporal Fourier transform of the pressure that is generated by the breathing wave and $k_b$ is the complex breathing wavenumber (rad/m) and is equal to $$k_b = \frac{\omega}{c_b}, \quad (17)$$

where $c_b$ is the complex breathing wave speed (m/s). The solutions to equations (15) and (16) are similar to equation (3), and they can be added together using the principle of superposition, which yields the total pressure in the shell as $$P(x,\omega)=P_e(x,\omega)+P_b(x,\omega)=Ae^{ik_e x}+Be^{-ik_e x}+Ce^{ik_b x}+De^{-ik_b x}, \quad (18)$$

where $P(x,\omega)$ is the temporal Fourier transform of the pressure that is generated by both the extensional wave and the breathing wave, and A, B, C, and D are wave propagation coefficients determined by the boundary conditions. It is now noted that the pressure field at x divided by the forward accelerometer is $$\frac{P(x,\omega)}{\ddot{U}} = Ae^{ik_e x}+Be^{-ik_e x}+Ce^{ik_b x}+De^{-ik_b x}, \quad (19)$$

where $\ddot{U}$ is the temporal Fourier transform of the forward accelerometer; A, B, C, and D are wave propagation coefficients; and $$\frac{P(x,\omega)}{\ddot{U}}$$

has units of Pa/g. It is not necessary to know the values of A through D to determine the breathing wave speed, as they will be extracted from the governing equations without explicitly determining their values. Five independent measurements of the spatial pressure field are needed to eliminate these wave propagation coefficients and solve for the breathing wave speed. These measurements are provided by hydrophones 16, 18, 20, 22, and 24. Without loss of generality, the origin of the coordinate system is defined as x=0 at hydrophone 20, the middle pressure sensor. Equation (19) is written to correspond to the locations of the five pressure sensors as $$\frac{P(-2\delta,\omega)}{\ddot{U}} = Ae^{-ik_e 2\delta}+Be^{ik_e 2\delta}+Ce^{-ik_b 2\delta}+De^{ik_b 2\delta} = S_1, \quad (20)$$

$$\frac{P(-\delta,\omega)}{\ddot{U}} = Ae^{-ik_e \delta}+Be^{ik_e \delta}+Ce^{-ik_b \delta}+De^{ik_b \delta} = S_2, \quad (21)$$

$$\frac{P(0,\omega)}{\ddot{U}} = A+B+C+D = S_3, \quad (22)$$

$$\frac{P(\delta,\omega)}{\ddot{U}} = Ae^{ik_e \delta}+Be^{-ik_e \delta}+Ce^{ik_b \delta}+De^{-ik_b \delta} = S_4, \quad (23)$$

and $$\frac{P(2\delta,\omega)}{\ddot{U}} = Ae^{ik_e 2\delta}+Be^{-ik_e 2\delta}+Ce^{ik_b 2\delta}+De^{-ik_b 2\delta} = S_5, \quad (24)$$

where L is the sensor-to-sensor spacing (m) and $S_1$ through $S_5$ correspond to the measured transfer function data.

Equations (21) and (23) are now added together yielding $$(A+B)\cos(k_e\delta)+(C+D)\cos(k_b\delta)=(\tfrac{1}{2})(S_2+S_4), \quad (25)$$

and equations (20) and (24) are added together producing $$(A+B)\cos(k_e 2\delta)+(C+D)\cos(k_b 2\delta)=(\tfrac{1}{2})(S_1+S_5). \quad (26)$$

Equation (22) is now rewritten with the term (A+B) on the left-hand side and substituted into equations (25) and (26) yielding $$C+D = \frac{(1/2)(S_2+S_4)-S_3\cos(k_e\delta)}{\cos(k_b\delta)-\cos(k_e\delta)} \quad (27)$$

and $$C+D = \frac{(1/2)(S_1+S_5)-S_3\cos(k_e 2\delta)}{\cos(k_b 2\delta)-\cos(k_e 2\delta)}, \quad (28)$$

respectively. Equations (27) and (28) are now set equal to each other. Applying a double angle trigonometric relationship to the $\cos(k_b 2\delta)$ term then produces $$X\cos^2(k_b\delta)+Y\cos(k_b\delta)+Z=0, \quad (29a)$$

where $$X=(S_2+S_4)-2S_3\cos(k_e\delta), \quad (29b)$$

$$Y=S_3\cos(k_e\delta)-(\tfrac{1}{2})(S_1+S_5), \quad (29c)$$

and $$Z=[(\tfrac{1}{2})(S_1+S_5)+S_3]\cos(k_e\delta)-(\tfrac{1}{2})(S_2+S_4)\cos(k_e 2\delta)-(\tfrac{1}{2})(S_2+S_4). \quad (29d)$$

Equation (29) is a quadratic form with solution $$\cos(k_b\delta) = \frac{-Y \pm \sqrt{Y^2-4XZ}}{2X} = \psi, \quad (30)$$

where $\Psi$ is a complex quantity. Equation (30) is similar to equation (7) and the corresponding solution is $$\cos[2Re(k_b)\delta] = [Re(\psi)]^2+[Im(\psi)]^2 - \sqrt{([Re(\psi)]^2+[Im(\psi)]^2)^2 - (2[Re(\psi)]^2-2[Im(\psi)]^2-1)} = r. \quad (31)$$

Note that only a negative sign in front of the radical is used in equation (31). However, both the negative and the positive signs in front of the radical in equation (30) are needed. The real part of $k_b$ in equation (31) is now solved for by $$Re(k_b) = \begin{cases} \dfrac{1}{2\delta}\text{Arccos}(r)+\dfrac{m\pi}{2\delta} & m \text{ even} \\ -\dfrac{1}{2\delta}\text{Arccos}(-r)+\dfrac{m\pi}{2\delta} & m \text{ odd} \end{cases}, \quad (32)$$

where m is a nonnegative integer and the capital A denotes the principal value of the inverse cosine function. The value of m is determined from the function r, which is a cosine function with respect to frequency. At zero frequency, m is 0. Every time r cycles through $\pi$ radians, m is increased by 1. The imaginary part of $k_b$ is determined in a manner similar to equation (13), resulting in $$Im(k_b) = \frac{1}{\delta} \log_e \left\{ \frac{Re(\psi)}{\cos[Re(k_b)\delta]} - \frac{Im(\psi)}{\sin[Re(k_b)\delta]} \right\}. \quad (33)$$

Now that the real and imaginary parts of the wavenumber $k_b$ are known, the complex-valued breathing wave speed can be determined at each frequency with $$c_b = Re(c_b) + iIm(c_b) = \frac{\omega}{k_b}. \quad (34)$$

Using this method produces two wave speed measurements because of the retention of the positive and negative signs in equation (30). One of the wave speeds is the breathing wave speed, and the other is the extensional wave speed, which was previously arrived at using the method above. The extensional wave speed is typically at least a factor of ten greater than the breathing wave speed.

In validating this method, the shell 10 is a longitudinally reinforced fluid-filled urethane shell 10 containing five equally spaced hydrophones 16, 18, 20, 22 and 24 placed in tension, as shown in FIG. 1. In this validation the shell 10 has a mean radius of 0.015 m, a thickness of 0.0028 m, and the internal fluid is a petroleum based dielectric oil having a density of 760 kg/m³. The axial tension on shell 10 is 890 N and the stressed length is 12.0 m. The point mass 32 has a weight of 13.6 kg. The data from the force transducers, accelerometers, and hydrophones are acquired in the time domain with an Hewlett Packard (HP) 3562 dynamic signal analyzer or the like electrically connected to the sensors. The analyzer Fourier transforms the raw data to the frequency domain to obtain the desired transfer functions. The test is run with a frequency range between 3 and 100 Hz.

Equations (5)–(14) are applied to the experimental test data taken with the force transducers and accelerometers, and the resulting extensional wave speed of the shell 10 is found. The Ordinary Least Square line (OLS) fit is applied to the data between 35 and 100 Hz to minimize the effect of breathing wave interaction as seen at lower frequencies. The resulting OLS fit was $c_e$=624.7+0.8 f (m/s) for the real part and $c_e$=69.0+0.4 f (m/s) for the imaginary part (where f is frequency in Hz). These same values are used for the extensional wave speed in the following calculations in order to determine the breathing wave speed.

Figure 2:
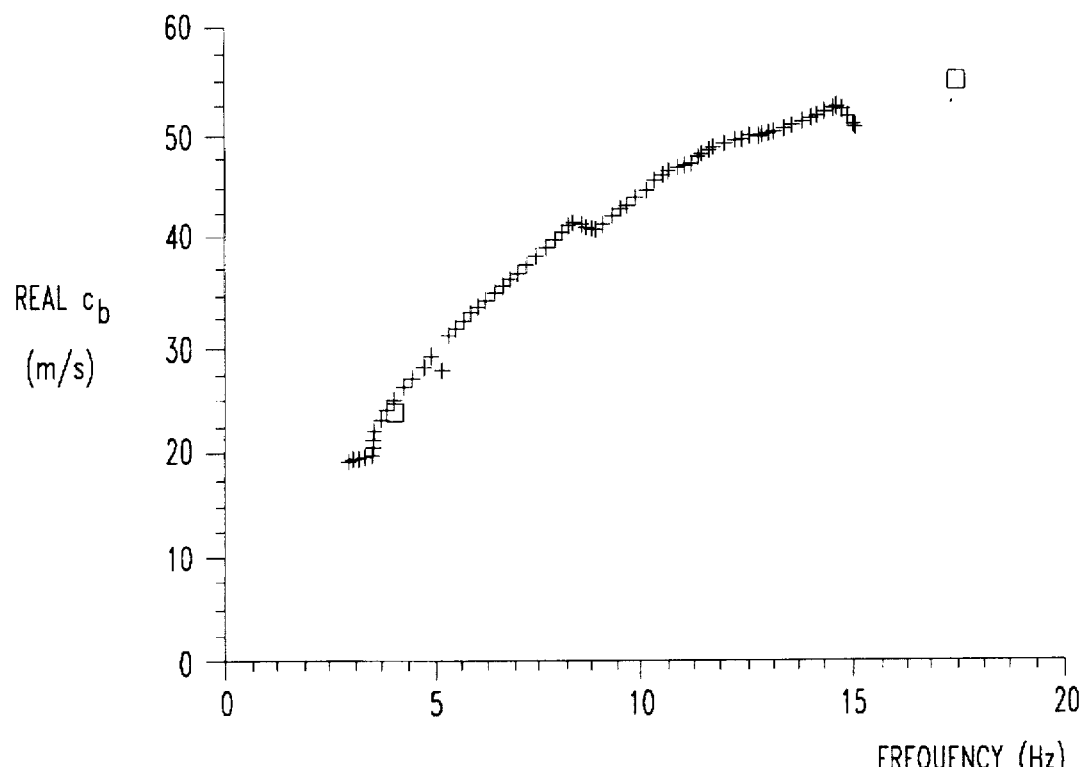
FIG. 2 is a graphic of real breathing wave speed as a function of frequency.
Figure 3:
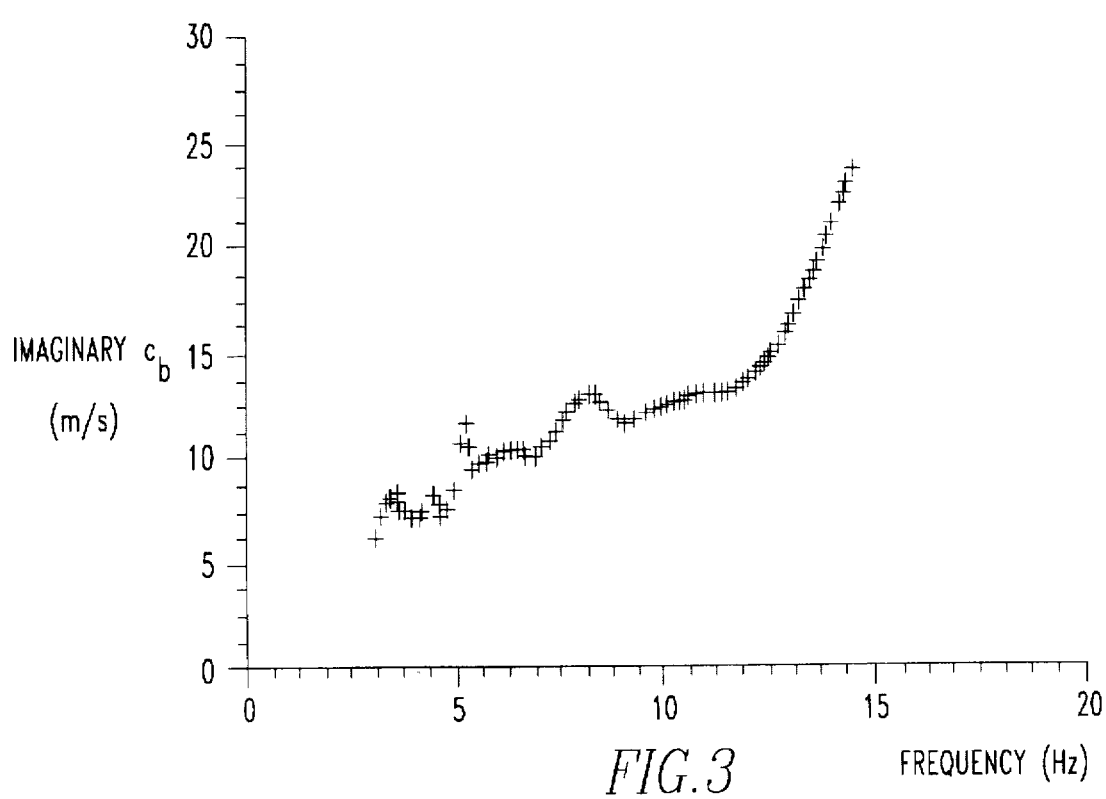
FIG. 3 is a graph of imaginary breathing wave speed as a function of frequency.

In the second part of this validation, transfer function data of the hydrophones 16, 18, 20, 22, and 24 divided by the forward accelerometer at 12 is collected. The hydrophones are spaced at intervals of 1.83 m with a distance of 2.96 m from the forward end of the shell 10 to the first hydrophone 16. Equations (25)–(34) are applied to the experimental test data, and the resulting breathing wave speed of the shell 10 is calculated. FIG. 2A is a plot of the breathing wave speed versus frequency. The plus symbols mark experimental data that were obtained using the method developed in this patent. The two box symbols are data points determined with the phase angle between the forward accelerometer and the first hydrophone. This measurement is accomplished by first unwrapping the phase angle (of $S_1$) to a continuous function whose ordinate ranges from 0 to 1000 degrees. Next, regions that appear "straight" are identified. For these experimental data, the regions are 3 to 5 Hz and 10 to 25 Hz. An OLS line is fit to both regions, and a single (propagation) wave speed is determined using $$c = d \frac{360 \Delta f}{\Delta \theta}, \quad (35)$$

where c is the corresponding real wave speed (m/s), d is the distance between sensors (m), $\Delta f$ is the change of frequency (Hz), and $\Delta\theta$ is the change of phase angle (degrees). The region from 3 to 5 Hz results in a (real) breathing wave speed of 24.0 m/s and the region from 10 to 25 Hz results in a breathing wave speed of 54.8 m/s. The shortcomings of this calculation (equation (35)) are that it cannot incorporate extensional wave interaction, requires single direction wave propagation, allows for measurement of only the real part of the breathing wave speed, and "straight" line identification is not a very objective test procedure. Additionally, it typically fails when the sensor-to-sensor separation distance is even moderately larger than that used in this experiment. However, it does provide a verification for the real part of the breathing wave speed measured in this experiment.

In FIG. 2B, it is noted that for this specific shell 10 the breathing wave is spatially coherent from 3 to 13 Hz. Above 13 Hz, the imaginary part of the measurement begins to diverge. The spatial coherence length is related to the loss factor of the circumferential modulus of the shell. A smaller circumferential loss modulus would result in a longer spatial coherence length and a coherent measurement at higher frequencies. Respacing the hydrophone distances or use of a shorter shell might also result in coherent measurements at higher frequencies. Changing the extensional wave speed by 20 percent and recalculating the breathing wave speed produced change in the breathing wave speed of less than 1 percent. Thus, the measurement method is very insensitive to incorrect extensional wave speeds.

The breathing wave speed of a liquid-filled shell can be determined with five equally spaced hydrophones. This technique separates the spatial pressure field into two waves: an extensional wave and a breathing wave. First, the extensional wave speed is determined using force transducers and accelerometers located at the ends of the shell. Next, the breathing wave speed is calculated using measurements from the hydrophones and the extensional wave speed measurement. The method yields a complex value at every frequency for which data are collected and for which the breathing wave is spatially coherent. This test can be run very rapidly, and the corresponding computations are not intensive.

While the present invention has been described in connection with the preferred embodiments of the various elements, it is to be understood that other similar embodiments may be used or modifications and additions may be made to the present described embodiment for performing the same function of the present invention without deviating therefrom. Therefore, the present invention should not be limited to any single embodiment, but rather construed in breadth and scope in accordance with the recitation of the appended claims.

What is claimed is:

1. A method of measuring breathing wave speed in a liquid filled shell comprising the steps of:

defining a spatial pressure field;

separating said spatial pressure field into an extensional wave component and a breathing wave component;

ascertaining the extensional wave speed of said separated extensional wave component;

measuring pressure in said liquid-filled shell; and calculating the breathing wave speed based on measurements of pressure in the liquid-filled shell and the ascertained extensional wave speed.

2. The method of claim 1 wherein said step of ascertaining the extensional wave speed comprises the steps of:

experimentally measuring force in the liquid filled shell; and experimentally measuring acceleration in the liquid-filled shell.

3. The method of claim 2 wherein said step of experimental measuring force comprises the steps of:

providing at least two transducers, said liquid filled shell having first and second ends, at least one transducer being located at said first end and at least one transducer being located at said second end; and measuring said force at said first end and said second end.

4. The method of claim 3 wherein said step of experimental measuring acceleration comprises the steps of:

providing at least two accelerometers, at least one accelerometer being located at said first end and at least one accelerometer being located at said second end; and measuring said acceleration at said first end and said second end.

5. The method of claim 4 wherein the shell is cylindrical.

6. The method of claim 1 wherein the step of measuring pressure in the liquid filled shell comprises the steps of:

providing at least one hydrophone within the liquid filled shell; and measuring the pressure at each said at least one hydrophone.

7. The method of claim 6 wherein the step of providing at least one hydrophone comprises providing a plurality of hydrophones positioned at equally spaced intervals within the liquid filled shell.

8. The method of claim 1 wherein the step of calculating breathing wave speed calculates the breathing wave speed by the following equation:

$$c_b = Re(c_b) + iIm(c_b) = \frac{\omega}{k_b}.$$

9. The method of claim 1 wherein the spatial pressure field is determined to be inside the liquid-filled shell.

10. An apparatus for determining breathing wave speed in a liquid filled shell comprising:

a first impedance head joined to a first end of said liquid filled shell;

a second impedance head joined to a second end of said liquid filled shell;

a shaker joined to the first impedance head for providing axial excitation to the shell;

a plurality of pressure measuring means disposed at regular intervals within said shell; and a tension producing means joined to the second impedance head for adjusting the tension in said shell.

11. The apparatus of claim 10 wherein said first and second impedance heads have first and second accelerometers disposed therein.

12. The apparatus of claim 10 wherein said first and second impedance heads have first and second force transducers disposed therein.

13. The apparatus of claim 10 wherein said tension producing means comprises a winch joined to said second impedance head by a cable.

14. The apparatus of claim 10 further comprising a mass interposed between the tension producing means and the second impedance head.

15. The apparatus of claim 10 further comprising:

a support means; and a flexible connection means joined between said shell and said support means to suspend the shell from the support means.

16. The apparatus of claim 10 further comprising a temperature controlled conduit surrounding the shell for providing testing at a controlled temperature.

* * * * *